United States Patent
Sauerländer et al.

(10) Patent No.: US 9,332,603 B2
(45) Date of Patent: May 3, 2016

(54) CIRCUIT ARRANGEMENT FOR OPERATING A LOW-POWER LIGHTING UNIT AND METHOD OF OPERATING THE SAME

(71) Applicant: KONINKLIJKE PHILIPS N.V., Eindhoven (NL)

(72) Inventors: Georg Sauerländer, Aachen (DE); Kumar Arulandu, Breda (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/358,278

(22) PCT Filed: Oct. 19, 2012

(86) PCT No.: PCT/IB2012/055728
§ 371 (c)(1),
(2) Date: May 15, 2014

(87) PCT Pub. No.: WO2013/072793
PCT Pub. Date: May 23, 2013

(65) Prior Publication Data
US 2014/0312796 A1 Oct. 23, 2014

Related U.S. Application Data

(60) Provisional application No. 61/560,409, filed on Nov. 16, 2011.

(51) Int. Cl.
*H05B 33/08* (2006.01)
(52) U.S. Cl.
CPC ........... *H05B 33/0815* (2013.01); *Y02B 20/346* (2013.01)

(58) Field of Classification Search
CPC .......... H05B 33/0815; H05B 33/0818; H05B 33/0809; H05B 37/029; H05B 37/02; H05B 41/3925; H05B 41/391; H05B 41/2828; H05B 33/0803
USPC .................................. 315/224, 291, 294, 210
See application file for complete search history.

(56) References Cited

U.S. PATENT DOCUMENTS

| | | | |
|---|---|---|---|
| 5,083,255 A | 1/1992 | Nilssen | |
| 2010/0289532 A1* | 11/2010 | Wendt et al. | 327/103 |
| 2010/0308655 A1* | 12/2010 | Wachi et al. | 307/31 |
| 2010/0327766 A1* | 12/2010 | Recker et al. | 315/291 |
| 2011/0210670 A1* | 9/2011 | Sauerlander et al. | 315/120 |
| 2012/0170330 A1* | 7/2012 | Yang et al. | 363/21.13 |
| 2012/0299500 A1* | 11/2012 | Sadwick et al. | 315/224 |
| 2014/0168567 A1* | 6/2014 | Kikuchi et al. | 349/61 |

FOREIGN PATENT DOCUMENTS

| | | |
|---|---|---|
| EP | 2242336 A1 | 10/2010 |
| EP | 2375860 A2 | 10/2011 |

* cited by examiner

*Primary Examiner* — Douglas W Owens
*Assistant Examiner* — Syed M Kaiser

(57) ABSTRACT

A circuit arrangement (3) is provided for operating at least one low-power lighting unit with a power supply (4) and in particular with a self-oscillating power supply. The circuit arrangement (3) comprises at least an input (12) for receiving an operating voltage (28) from said power supply (4) and an output (11) for connection to one or more low-power lighting units. To allow an efficient operation of said low-power lighting unit with the power supply (4), the circuit (3) comprises a pulse generator (17), connected with said input (12) and adapted to inject at least one trigger pulse (40a, 40b) into said power supply (4) during operation.

16 Claims, 5 Drawing Sheets

CIRCUIT ARRANGEMENT FOR OPERATING A LOW-POWER LIGHTING UNIT AND METHOD OF OPERATING THE SAME

CROSS-REFERENCE TO PRIOR APPLICATIONS

This application is the U.S. National Phase application under 35 U.S.C. §371 of International Application No. PCT/IB2012/055728, filed on Oct. 18, 2012, which claims the benefit of [e.g., U.S. Provisional Patent Application No. or European Patent Application No.] 61/560,409, filed on Nov. 16, 2011. These applications are hereby incorporated by reference herein.

TECHNICAL FIELD

The present invention relates to the field of lighting and in particular to a circuit arrangement for operating a low-power lighting unit such as an LED unit, with a power supply and a method of operating the same.

BACKGROUND ART

In the field of lighting, present developments aim to replace common incandescent or halogen lamps with so-called retrofit lamps, in particular using light emitting diodes (LEDs), where they are preferred over conventional lamps due to significant advantages such as increased energy efficiency and lifetime.

When retrofitting existing lighting systems with such lamps, it is typically required to adapt the retrofit lamp to the respective lighting system installed to allow proper operation, since a change in the setup or wiring of the respective lighting system to be retrofitted, for example installed in an office building, is not easily possible and would result in substantially increased cost of the overall retrofit process.

A particular example for the above mentioned retrofit application is the replacement of common halogen type lamps in low-voltage lighting systems. Such lighting systems typically comprise a power supply to provide a secondary side voltage of e.g. 12V AC, which is then used to operate the lamp or lamps. To provide the secondary voltage, electronic type, so-called switching mode power supplies (SMPS) are used. Here, the 50/60 Hz sinusoidal mains voltage is converted to a higher frequency, resulting in smaller transformers to obtain the secondary voltage of e.g. 12V AC.

In the art, various setups of switching mode power supplies are employed to provide the higher frequency. In a so-called self-oscillating power supply, a switching regulator is arranged to alternate the polarity of the rectified mains voltage and thus to provide a high-frequency alternating voltage to a transformer. The secondary side of the transformer is connected to the lamp to provide power to it. The self-oscillating type power supply further comprises a start-up circuit to initiate the switching operation upon connection with power. The oscillation is then self-maintained until the next zero-crossing of the mains voltage, typically using a feedback winding of the transformer to control the switching regulator. A restart is needed at least at each zero-crossing of the mains voltage, which is typically controlled by said start-up circuit of said power supply.

While the above self-oscillating power supply provides a stable operation when used with a common type of lamp, problems arise when using a low-power lamp. Here, the reduced power consumption, although beneficial for aspects of energy efficiency, causes an early disruption of the self-oscillating operation, since the power supply can only maintain the self-oscillation when a defined minimum current is drawn by the lamp. Accordingly, power cannot be provided by the supply to the lamp during substantial periods in each half-cycle of the mains voltage, i.e. between zero-crossings, which can result in an unstable operation, causing e.g. optical flicker.

Corresponding types of self-oscillating power supplies are e.g. disclosed in the publication "Elektronik ecodesign 2007", WEKA FACHMEDIEN GmbH, Germany, page 30ff.

Accordingly, it is an object of the present invention to provide a circuit arrangement, allowing to efficiently operate a low-power lighting unit with a self-oscillating power supply unit with improved optical and electrical properties.

DISCLOSURE OF INVENTION

The object is solved by a circuit arrangement according to claim 1, a LED lamp according to claim 13, a lighting system according to claim 14 and a method of operating a circuit arrangement according to claim 15. The dependent claims relate to preferred embodiments of the invention.

The basic idea of the present invention is to inject at least one trigger pulse into the secondary or output side of a power supply, such as a self-oscillating power supply, i.e. from a corresponding circuit arrangement, connected with the output of said power supply during operation.

The present inventors have surprisingly found that the injection of trigger pulses into a self-oscillating power supply from the secondary side may provide a start or restart of the self-oscillation of said power supply, for example in case the self-oscillation has been disrupted because the current drawn is below the minimum current of said power supply or in case the self-oscillation fades out due to the operating mode of a connected lighting unit.

The present invention thus advantageously allows an enhanced operation of a low-power lighting unit, such as a LED unit, with a typical self-oscillating power supply, even in case only a relatively low average current, e.g. lower than the minimum current of said power supply, is drawn by the lighting unit.

Optical flicker, resulting from an unstable operation of the power supply or an early drainage of a buffer of said lighting unit, can thus be substantially reduced. In addition, since the present invention allows controlling the start or restart of the self-oscillation from the secondary side of the power supply, a more flexible control of a conduction time is provided, allowing to increase the power factor of the overall setup.

Furthermore, the circuit arrangement according to the present invention enhances the compatibility of operating low-power lighting units with dimming type power supplies, e.g. comprising a phase-cut dimmer. In addition, the circuit arrangement according to the present invention is compatible also with electromagnetic transformers, so that the invention is highly versatile.

According to the invention, a circuit arrangement is provided for operating a low-power lighting unit with a power supply, such as a self-oscillating power supply, e.g. to retrofit a conventional lamp of incandescent or halogen type. The circuit arrangement comprises at least an input for receiving an operating voltage from said power supply, an output for connection to said at least one low-power lighting unit and a pulse generator, connected with said input and adapted to inject at least one trigger pulse into said power supply.

The input and output may be of any suitable type to allow a connection to the power supply and said at least one low-power lighting unit, respectively, and e.g. comprise each two electric terminals, such as connecting pins, solder pads or any other suitable connector or plug to allow a corresponding permanent or detachable electrical connection. The input and output certainly may comprise further electrical or mechanical components. For example, the input may be provided with a filter device for smoothing the voltage, provided from the power supply. The output may e.g. be adapted with a buffer stage and/or driver unit, i.e. to set the voltage and/or current of the lighting unit, for example according to the respective type of lighting unit used and/or according to a defined dimming level, set by the user.

The input is adapted to receive an operating voltage from the power supply at least during operation, i.e. when said input of the circuit arrangement according to the invention is electrically connected to an output of said power supply, which is also referred to as a connection to the "secondary side" of said power supply.

In the context of the present explanation, a power supply may be of any suitable type to provide the operating voltage to the one or more low-power lighting units. Preferably, the power supply is a switching mode power supply (SMPS), e.g. comprising a high-frequency switching regulator. The invention is particularly suitable for use with integrated circuit controlled (IC) power supplies. Most preferably, the power supply is a self-oscillating power supply, sometimes also referred to as "self-oscillating converter", which is understood as a switching mode power supply, comprising a switching regulator and a transformer, where a high-frequency oscillation of said switching regulator is controlled by a feedback of the high-frequency oscillation, thus providing a self-oscillating operation.

The power supply may preferably be provided with an AC voltage at its input, such as a mains voltage, which in the following is referred to as "primary side voltage" or "primary side alternating voltage". The power supply may thus be an AC power supply. The primary side voltage in case of an AC power supply typically is rectified before the switching regulator, e.g. using a bridge type rectifier. Certainly, a setup is possible, where a rectifier is arranged externally of said power supply, thus resulting in a rectified primary side voltage being provided to said power supply. Alternatively, the power supply may be provided with a DC voltage.

To initiate the switching operation or oscillation of said switching regulator upon connection with power, the power supply may comprise a start-up circuit, which furthermore serves to restart the self-oscillation at each zero-crossing of the primary side voltage, i.e. when the primary side voltage is approx. 0V. Such restart control may be necessary, since due to the fact that the rectified mains voltage is directly fed to the switching regulator and typically not buffered by a larger sized capacitor, the primary side voltage of the transformer is virtually zero around the zero-crossings of the mains voltage, so that the feedback winding does not provide a voltage to maintain the self-oscillation. The start-up circuit may comprise any suitable type of electronic circuitry. In one example, the start-up circuit may be realized using a diac, coupled with an RC network to the primary side voltage to inject a start-up pulse in the switching regulator. For example, in case the switching regulator is a half-bridge, the start-up pulse is injected into the base of one of the half-bridge transistors.

The inventive circuit arrangement is particularly advantageous when operated with a self-oscillating half-bridge power supply, e.g. comprising a half-bridge switching regulator and a corresponding transformer. The feedback for the operation of the switching regulator in said half-bridge power supply may be provided using a feedback winding of said transformer or of a separate current transformer to trigger said switching regulator accordingly.

The operating voltage, supplied by the self-oscillating power supply to the circuit arrangement may be of variable or alternating type. Due to the switching behavior of the power supply, the operating voltage shows a high-frequency oscillation, higher than the typical 50/60 Hz mains frequency. In case of an AC power supply, the high-frequency oscillation is amplitude-modulated by a (rectified) sine wave, typically corresponding to the (rectified) primary side alternating voltage. The operating voltage thus typically exhibits a high-frequency component and an envelope component at a lower frequency.

Preferably, the high-frequency component of the operating voltage shows a frequency between 20 and 250 kHz. The envelope component may have a frequency of 40-450 Hz. Most preferably, the operating voltage is a safety-low voltage, i.e. equal to or less than 50 V RMS, most preferred equal to or less than 25 V or 14 V RMS.

The at least one low-power lighting unit may be of any suitable type. The term "low-power" relates to the power consumption of the lighting unit compared to that of a conventional lamp, like an incandescent of halogen lamp. The power consumption of the at least one lighting unit is preferably below 25 W, more preferably below 15 W and particularly preferred below 10 W.

Preferably, the at least one low-power lighting unit is an LED unit. In the present context, a "LED unit" is understood to comprise at least one light emitting diode (LED), which in terms of the present invention may be any type of solid state light source, such as an inorganic LED, organic LED or solid state laser, e.g. a laser diode. The LED unit may certainly comprise more than one of the before mentioned components connected in series and/or in parallel. The low-power lighting unit may certainly comprise further electric, electronic or mechanical components, such as for example a driver unit, e.g. to set the brightness and/or color, a smoothing stage, and/or one or more filter capacitors.

The circuit arrangement according to the invention further comprises said pulse generator, as discussed above. The pulse generator is at least temporarily connected with said input and thus, during operation, with the output of the self-oscillating power supply to inject said at least one trigger pulse into said power supply. In the present context, the term "injection" of a trigger pulse is understood as providing a current at least temporarily to the output of said power supply, i.e. to the secondary side thereof. Thus, electrical power is provided by said circuit arrangement to said power supply, i.e. opposite to the direction of power transfer during normal operation.

The provision of the trigger pulse during operation causes current flow at the output of the power supply and accordingly through the connected secondary winding of the transformer and/or the current transformer of said power supply. Due to the inductive coupling in the transformer, a voltage is generated in the feedback winding, which provides the switching regulator to restart its self-oscillating operation.

The inventive driver circuit thus advantageously enables to control the operation of the self-oscillating power supply from the secondary side and independent from the mentioned operation of the start-up circuit. As discussed above, this is particularly beneficial in combination with a low-power lighting unit, having a nominal current, lower than the minimum current of said power supply, since is this case an early extinguished self-oscillation, i.e. between the zero-crossings of the primary side alternating voltage, can be restarted.

The present invention thus e.g. allows to control the conduction interval, i.e. the time in which power is transferred by said power supply to the lighting unit in each half cycle of said primary side alternating voltage, i.e. between two subsequent zero-crossings, as discussed above. The inventive circuit arrangement thus is particularly advantageous in retrofit applications, since a stable operation of a low-power lighting unit is possible without a modification of the power supply being necessary.

The amplitude and the duration of said at least one trigger pulse may be chosen in dependence of the application and in particular in dependence of the respective type of power supply. For example, in case the switching regulator comprises one or more MOSFET transistors, the trigger pulse should allow charging the input capacitance of said MOSFET transistor to set the transistor to a conductive state, e.g. 0.1 or more nC. In case the respective switching regulator comprises one or more bipolar transistors, the trigger pulse should provide a base current of at least 0.1 mA, preferably at least 10 mA to drive the transistor. In both cases, the current in said feedback winding certainly depends on the transformer and the transformer ratio between secondary and feedback winding. In general, a trigger pulse, providing a current of at least 1 mA on the primary side of the transformer/power supply is preferred for most applications.

The duration of the trigger pulse is preferably between 100 ns and 10 μs. A variety of pulse forms may be used, such as a square pulse or an exponentially decaying pulse.

To provide the at least one pulse, the pulse generator may for example comprise a suitable type of controllable current source. Preferably, the pulse generator comprises a switchable energy storage device. The pulse generator in this case may inject said trigger pulse by (temporarily) connecting said energy storage device with the input and thus with the connected power supply. The pulse generator may be equipped with at least one corresponding switch, such as a MOSFET or bipolar transistor, to control the connection between energy storage and the input of the circuit arrangement. The energy storage device may be of any suitable type to at least temporarily store an electric charge and may for example comprise one or more capacitors and/or batteries.

As discussed above, a restart of the switching regulator of said power supply may be necessary each time the oscillation extinguishes or fades out. The pulse generator thus preferably is configured to inject multiple trigger pulses into said power supply. Most preferably, the generation of trigger pulses is controlled in dependence of said operating voltage, applied to input of the circuit arrangement during operation, to improve the operation of the overall setup. Therefore and according to a preferred embodiment, the circuit arrangement comprises a pulse controller, connected at least with said pulse generator and configured to control said pulse generator in dependence of said operating voltage and/or in dependence of the electrical requirements of the one or more low-power lighting units being connected, such as voltage, current and/or power required.

The pulse controller may be of any suitable type to control the pulse generator. For example, the pulse controller may comprise a microcontroller provided with a corresponding programming. Certainly, the pulse controller may alternatively or additionally comprise discrete electronic circuitry to provide a cost-efficient setup. While the connection between pulse controller and pulse generator may be of any wired or wireless, direct or indirect type to provide a control of the generation and injection of the trigger pulse by the pulse controller, a wired connection is preferred.

With regard to the operation of the pulse controller and the injection of said trigger pulse in dependence of the operating voltage, various embodiments are possible, some of which are discussed in the following.

In a preferred embodiment, the pulse controller may be configured to determine from said operating voltage, whether the power supply is in a self-oscillating mode, i.e. whether power is provided to the circuit arrangement during operation, and to control said pulse controller to inject said trigger pulse in case no power is provided.

The present embodiment provides that when the oscillation of the power supply fades out, a restart of the switching regulator is initiated by injection of said trigger pulse, so that the conduction time is increased. The operation advantageously results in a more stable operation of the connected low-power lighting unit.

To provide the above operation, the pulse controller may preferably be connected with a power detector for determining the operating voltage and/or current at the input. Most preferably in the above case, the pulse controller may be configured to determine, whether the operating voltage/current, applied to said input during operation, corresponds to a minimum threshold. In case the voltage and/or current is below said threshold, the pulse generator may further be configured to control the pulse generator, so that an according trigger pulse is provided to the power supply to restart the self-oscillation thereof.

Additionally or alternatively to the above, an envelope detector may be provided, connected with said input and said pulse controller, wherein the envelope detector is configured to determine cycle information of the envelope component of said operating voltage. The pulse controller may be configured to control said pulse generator, so that at least one trigger pulse is injected into said power supply in each cycle of said envelope component.

The above embodiment is based on the recognition, that information of the timing or phase of the primary side alternating voltage, i.e. at the primary side of the power supply, can be determined from the operating voltage, provided to the circuit arrangement during operation. As mentioned in the preceding, the operating voltage may comprise a low-frequency envelope component, which typically corresponds to the (rectified) primary side alternating voltage. Accordingly, it is advantageously possible to provide the trigger pulse to be generated in each half cycle of said primary side alternating voltage and thus in synchronization with said primary side alternating voltage, by injecting said trigger pulse in each cycle of said envelope component.

In the context of the present embodiment, the term "cycle information" may correspond to any type of information with regard to timing, frequency or cycle period of the envelope component of the operating voltage, thus corresponding to said primary side alternating voltage. Certainly, a fixed delay between primary side voltage and the envelope component at the output of said envelope detector may be present.

Preferably, the cycle information comprises the timing of "zero-points" in the envelope component, which correspond to the timing of the zero-crossings of said primary side alternating voltage. The term "zero-point" thus refers to a moment of substantially no voltage, i.e. when the voltage amplitude of the envelope component is approx. 0 V. A "cycle" with regard to the envelope component thus refers to the interval between two subsequent zero-points and accordingly corresponds to a half cycle of the primary side alternating voltage.

The envelope detector may be of any suitable type to provide said cycle information to said pulse controller, e.g. using a microcontroller with a suitable programming. For example, the envelope detector may be adapted for high-frequency demodulation of the operating voltage, i.e. to remove the high-frequency component, and comparing the demodulated signal with a threshold close to 0 V. Accordingly, the envelope detector is adapted to determine the above mentioned "zero-points" in the envelope component of the operating voltage and thus "cycle information".

Alternatively or additionally, the envelope detector may comprise a sample-and-hold circuit to determine two subsequent local high-frequency maxima of the operating voltage and to interpolate the phase to determine the timing of the "zero-point" respectively.

The positioning of the at least one trigger pulse in each cycle, i.e. the timing of the trigger pulse with respect to a zero-point, may be chosen according to the application. Certainly, the pulse controller may preferably provide that multiple trigger pulses are generated per cycle of said envelope component, e.g. in dependence of the power, required by the lighting unit.

Most preferred, the pulse controller is configured to control said pulse generator, so that said at least one trigger pulse is injected with a predefined phase angle in each cycle, i.e. after the lapse of a predefined time interval after each zero-point. The present embodiment increases the power factor and allows a cost-efficient setup.

According to a further preferred embodiment, the inventive circuit arrangement further comprises a switching device, wherein said switching device being controllable by said pulse controller and arranged to control the connection between said one or more low-power lighting units and said power supply.

The switching device is provided to at least temporarily disconnect said low-power lighting units from power to allow a more flexible control. The switching device may be of any suitable type and e.g. comprise at least a bipolar transistor or MOSFET, connected with said pulse controller. The switching device may e.g. be arranged between said input and said output to allow a control of the connection of the one or more lighting units with power. Certainly, an embodiment is conceivable, where the switching device is formed integrally with either input or output. For example the switching device may be formed integrally with a buffer stage and/or driver unit of said output.

The switching device may be controlled by the pulse controller according to the respective application. Preferably, the pulse controller is configured to control said switching device, so that the at least one lighting unit is disconnected from said power supply for the duration of an OFF-interval, e.g. some ms, subsequent to the zero-point in each cycle.

The present embodiment provides that the oscillation of the switching regulator, initiated by said start-up circuit of the power supply, fades away quickly, since no substantial load is present and without transferring power to the one or more lighting units. The present embodiment advantageously allows higher pulse frequencies up to 100 Hz-40 kHz. In addition, the operation of the circuit can be further enhanced, in case the pulse controller is preferably configured to inject the trigger pulse with a predefined phase angle to said zero-point in each cycle, as discussed above, said phase angle or the respective time interval being longer than said OFF-interval.

The according control provides that the conduction interval in each cycle, i.e. the time, in which power is transferred to the at least one lighting unit, which normally starts shortly after the zero-point due to the start-up circuit of the power supply, is shifted towards a larger phase angle. Accordingly, the present embodiment allows to freely position the conduction interval in each cycle according to the application.

Most preferably, the pulse controller is configured to control the switching device and the pulse generator, so that the conduction interval in each cycle is centered around a peak voltage, i.e. the peak of the envelope component or primary side voltage, respectively. The present embodiment provides that the conduction interval is substantially symmetrical to each cycle, e.g. centered between two subsequent zero-points. The embodiment thus enables high efficiency and power factor, since the conduction interval is set to a time in each cycle, where the provided primary side voltage is at maximum.

Alternatively or additionally, the pulse controller may be configured to control said switching device and said pulse generator, so that a plurality of OFF-intervals are provided, where between subsequent OFF-intervals at least one trigger pulse is generated. According to the present embodiment, typically short OFF-intervals may be used, which are interlaced with corresponding trigger pulses. Accordingly, the current flow to the one or more lighting units is distributed or "spread" over the cycle of the envelope component, i.e. as mentioned above, over the half cycle of the primary side alternating voltage. The according operation thus results in a "burst mode" which provides further improved dimmability. The frequency of the OFF-intervals may be chosen at a higher frequency, for example between 100 Hz-40 kHz. Most preferably, the frequency or duty-cycle of the operation, i.e. the ratio between the on-time of the load and the off-time of the load, is set in dependence of the load or load information of the one or more lighting units as described further below.

In the case of the above "burst mode" operation, it is preferred that before the injection of a trigger pulse, the oscillation of the switching regulator is faded out.

While in general some or all of said multiple trigger pulses may have the same polarity, in accordance with a further preferred embodiment, the pulse generator is adapted to provide at least first trigger pulse with a forward polarity and a second trigger pulse with a reverse polarity. The pulse generator thus allows providing at least a first and second trigger pulse, where the polarity of the second trigger pulse, applied to the terminals of the input, is opposite to the polarity of the first trigger pulse.

The pulse generator may be adapted to generate the first and second trigger pulse by any suitable means. Preferably, the pulse generator comprises at least a first and a second switchable energy storage device, which energy storage devices are e.g. connected parallel with and opposing to each other to provide said first and second trigger pulses.

The present embodiment may facilitate the restart of the self-oscillating operation of said power supply. Depending on the specific setup of self-oscillating power supply, it is beneficial when the polarity of the trigger pulse corresponds to the momentary polarity or phase of the high-frequency component of the operating voltage. Therefore, it is preferred that the circuit arrangement further comprises a phase detector, connected with said input and said pulse controller and configured to determine a phase of a high-frequency component of said operating voltage, wherein said pulse controller is configured to control said pulse generator, so that said trigger pulse is in phase with said high-frequency component. Alternatively or additionally, the pulse controller may be configured to generate multiple pulses with alternating polarity.

According to another preferred embodiment of the invention, the pulse controller is configured to determine load information of said at least one or more low-power lighting units and to control the pulse generator in dependence of the load information.

The present embodiment enables a further improved control of the circuit arrangement, e.g. according to the power consumption of the at least one low-power lighting unit. In the context of the present embodiment, the term "load information" may refer to the power and/or current consumption of the at least one low-power lighting unit, e.g. determined at the output, and/or the flux generated by said at least one low-power lighting unit.

In the latter case, the pulse controller may for example be connected with a photo detector so that the luminous flux of the at least one low-power lighting unit during operation may be determined accordingly.

According to the present embodiment, the pulse controller is configured to control the pulse generator in dependence of the load information. For example, the pulse controller may be adapted to determine the number of pulses per cycle of the envelope, i.e. the pulse frequency, in dependence of the load information. In case of a relatively low load, such as e.g. present when the low-power lighting unit is in a dimmed state, the pulse frequency is chosen accordingly high to maintain the self-oscillating operation of the power supply.

The circuit arrangement according to the present invention may certainly comprise further components, for example a driver unit to control the current and/or voltage provided to the at least one low-power lighting unit, connected to said output.

Furthermore, the output may comprise a buffer stage to provide a substantially constant current, which enhances the operation in particular when said low-power lighting unit is sensitive to variations in the current, such as in case LEDs are used. Additionally or alternatively, the driver unit may be adapted for dimming operation, i.e. to control the current, provided to the at least one low-power lighting unit according to a desired dim level, e.g. be provided by an external dimming signal.

Preferably, the circuit arrangement comprises a rectifier circuit, connected with said input and arranged parallel to said pulse generator. The provision of a rectifier parallel to the pulse generator facilitates the injection of the at least one trigger pulse into said self-oscillating power supply in particular in case a first and second trigger pulse with opposing polarity needs to provided.

According to a second aspect of the present invention, an LED lamp with a circuit arrangement as described in the preceding and at least one LED unit is provided, wherein said at least one LED unit is connected to the output of said circuit arrangement. The circuit arrangement described above and the at least one LED unit may preferably be formed integrally with each other, e.g. in a common lamp housing to provide a most compact setup.

In a further aspect of the present invention, a lighting system is provided, comprising a power supply, e.g. a self-oscillating power supply, and one or more LED lamps as discussed above.

Finally and in a further aspect of the invention, a method of operating at least one low-power lighting unit with a circuit arrangement is provided, which circuit arrangement comprises at least an input for receiving an operating voltage from a power supply, an output for connection to one or more low-power lighting units and a pulse generator, connected with said input. Here, at least one trigger pulse is injected into said power supply during operation.

With reference to the before mentioned additional aspects of the invention, it is noted that the circuit arrangement, lighting unit and power supply may be adapted according to one or more of the preferred embodiments, described above with reference to the main aspect of the invention.

BRIEF DESCRIPTION OF THE DRAWINGS

The above and other aspects of the present invention are discussed in detail below with reference to the accompanying drawings, in which.

DESCRIPTION OF EMBODIMENTS

Figure 1:
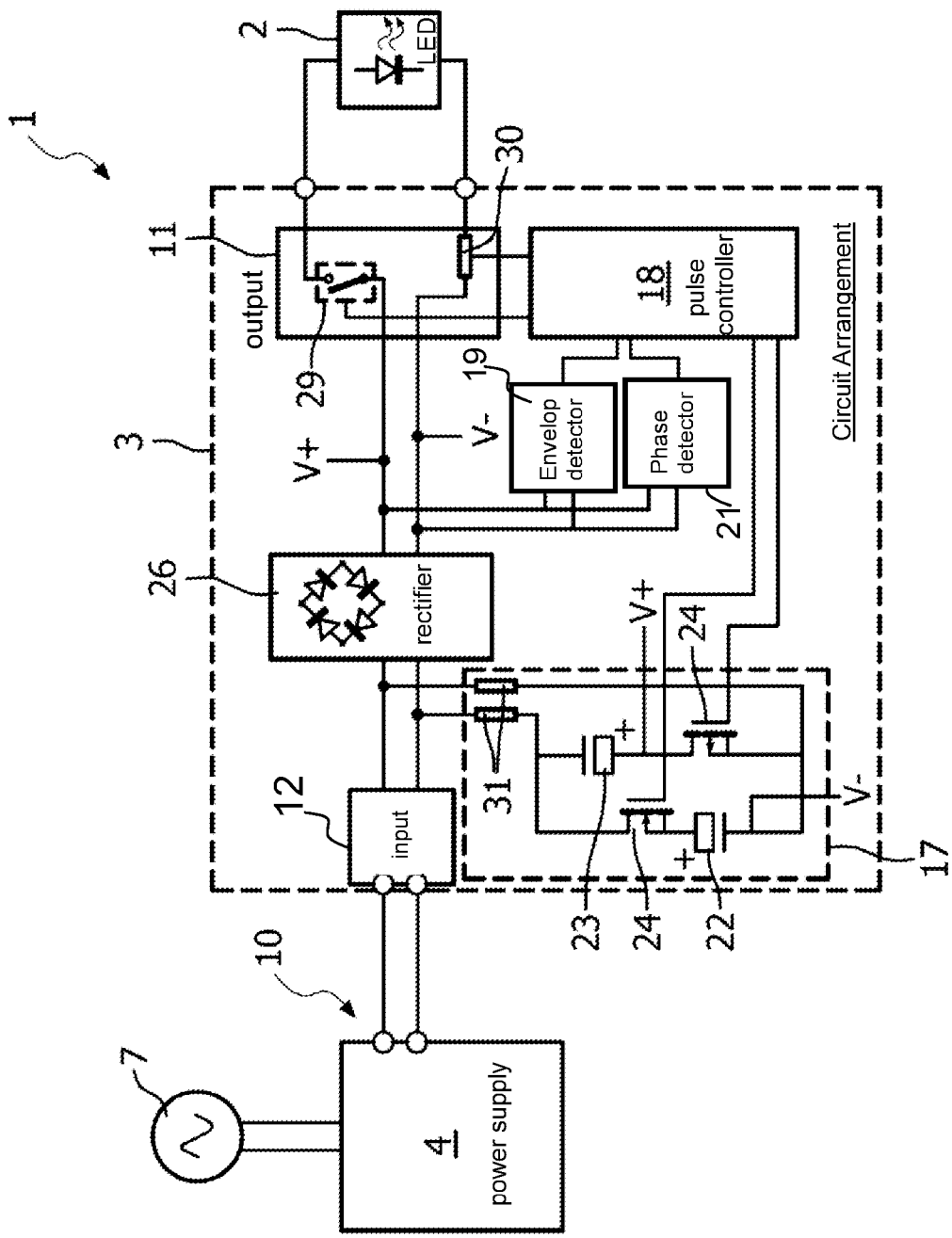
FIG. 1 shows an embodiment of a LED lamp with a circuit arrangement and an LED unit according to the invention connected with a self-oscillating power supply.

FIG. 1 shows an embodiment of a lighting system comprising an LED lamp 1, connected to an electronic, switching mode power supply of self-oscillating type, in the following referred to as self-oscillating power supply 4. The power supply 4 corresponds to a 12 V power supply of a typical halogen lighting system and is connected to mains 7 and thus receives a 110/230 V (sinusoidal) alternating voltage 27 at its primary side. The power supply 4 provides an operating voltage of 12 V RMS at its secondary side terminals 10, connected to the LED lamp 1.

The LED lamp 1 comprises a LED unit 2, which according to the present embodiment is equipped with a series connection of four high-power semiconductor light emitting diodes (not shown), each providing a luminous flux of more than 10 lm under nominal operating conditions. The LED lamp 1 further comprises circuit arrangement 3, adapted to provide power to the LED unit 2 during operation. As shown, an input 12 of the circuit arrangement 3 of the LED lamp 1 accordingly is connected to the secondary side terminals 10 of self-oscillating power supply 4.

The input 12 according to the present embodiment is integrally formed with a housing (not shown) of LED lamp 1 and comprises a GU 5.3 type socket connector. To provide power to the LED unit 2, output 11 is connected with the input 12 over rectifier 26. Output 11 is integrally formed with a driver unit and buffer stage (both not shown) to provide the LED unit 2 with a constant current. Furthermore, the output 11 comprises switching device 29 to disconnect the LED unit 2, the driver unit and the buffer stage from power temporarily. The switching device 29 according to the present example is a MOSFET.

In addition to providing power to the LED unit 2, the circuit arrangement 3 allows to inject trigger pulses 40a, 40b into the self-oscillating power supply 4 through its secondary side terminals 10. The circuit arrangement 3 accordingly comprises a pulse generator 17 controlled by pulse controller 18. The injection of the trigger pulses 40a, 40b, i.e. the provision of short current pulses to the output terminals 10 of power supply 4, enhances the stability of operation, when using a typical self-oscillating power supply 4 with a relatively low load, such as the LED unit 2.

The pulse controller 18 comprises a microprocessor (not shown) with a suitable programming to control the operation of the pulse generator 17. In addition to the connection with pulse generator 17, pulse controller 18 is connected with the output 11 to control the operation of switching device 29 and to determine the momentary load of the LED unit 2 using current detector 30, so that a precise positioning of the trigger pulses 40a, 40b is possible. Furthermore, pulse controller 18 is connected with an envelope detector 19 and phase detector 21. Envelope detector 19 allows to determine cycle information of an envelope component of the operating voltage 28 and thus to determine the timing of zero-points 20, as will be explained in the following.

The pulse generator 17 comprises a first capacitor 22 and a second capacitor 23 to inject the trigger pulses 40a, 40b into the power supply 4. As can be seen from FIG. 1, the two capacitors 22, 23 are connected with opposing polarity with input 12, so that it is possible to inject trigger pulses with a forward and a reverse polarity. Two transistors 24, controlled by the pulse controller 18 are provided to switch the connection of the associated first and second capacitor 22, 23 with the input 12 and thus with the power supply 4. Resistors 31 allow charging of the capacitors 22, 23 when the transistors 24 are in the open state using reverse body diodes of transistors 24.

Figure 2:
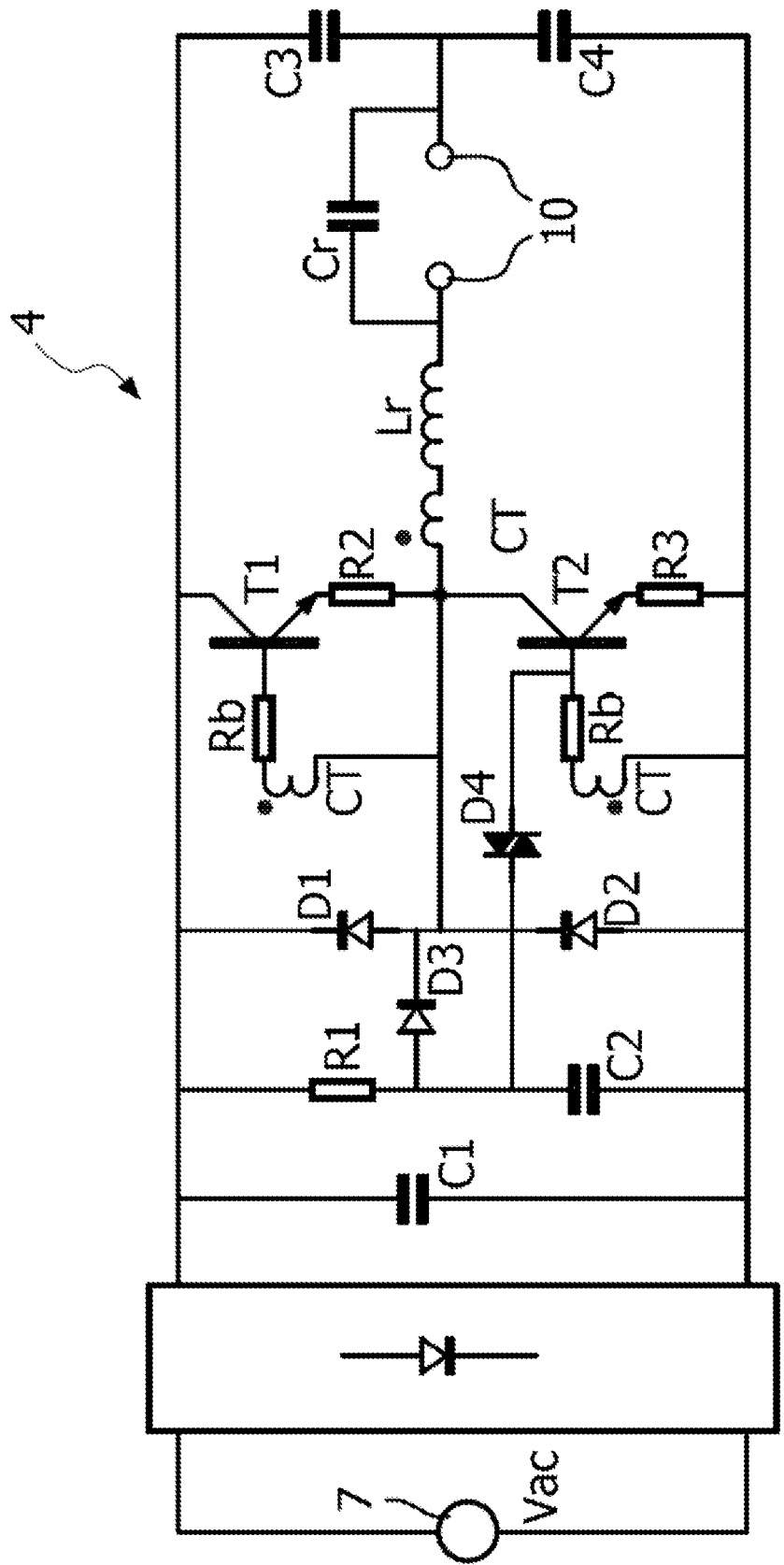
FIG. 2 shows an embodiment of a self-oscillating power supply.

Although it is noted that corresponding self-oscillating power supplies 4 are known in the art, an embodiment of typical half-bridge self-oscillating power supply 4 is shown in FIG. 2 to clarify its operation. As mentioned above, the self-oscillating power supply 4 is a switching mode power supply, comprising a full bridge rectifier at its input side, filter capacitor C1 with voltage Uz and a start-up circuit consisting of R1 and C2. A transistor half-bridge is formed by T1 and T2 with freewheeling diodes D1, D2. Furthermore, the power supply 4 comprises a current transformer CT, ballast inductor Lr, resonant ignition capacitor Cr, current shunt resistors R2, R3 and a capacitive voltage divider formed by C3 and C4.

During normal operation, the transistor half-bridge is driven by the current transformer CT. The current in transistor T1 is kept conducting by the positive feedback of CT until the inductor current iL through inductor Lr reaches a voltage at which the resulting base emitter voltage of T1 is too low to drive the required current. That level is defined by the CT output voltage and the negative voltage feedback over R2. At that moment the CT output voltage reverses polarity, turning off transistor T1 and turning on T2, again until the current iL reaches its predefined negative peak.

R1 and C2 is a startup circuit: at power on the voltage across C2 builds up until diac D4 reaches its breakdown voltage, turning on transistor T2. Retriggering during operation is prevented by periodically discharging C2 through transistor T2 and diode D3. Resistors Rb may be used to improve startup.

Capacitor Cr mainly allows to operate a fluorescent lamp and to ignite the latter and is not needed when operating power supply 4 with a LED unit 2.

Figure 3A:
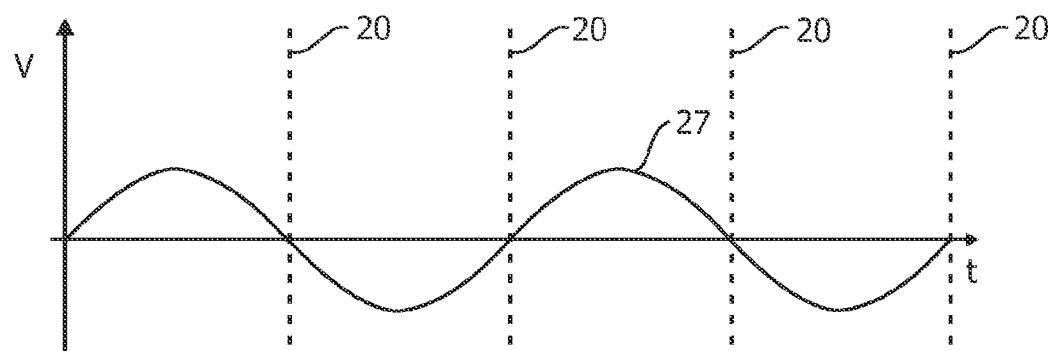
FIGS. 3a and 3b illustrate the operation of the self-oscillating power supply according to FIG. 2 in schematic timing diagrams.
Figure 3B:
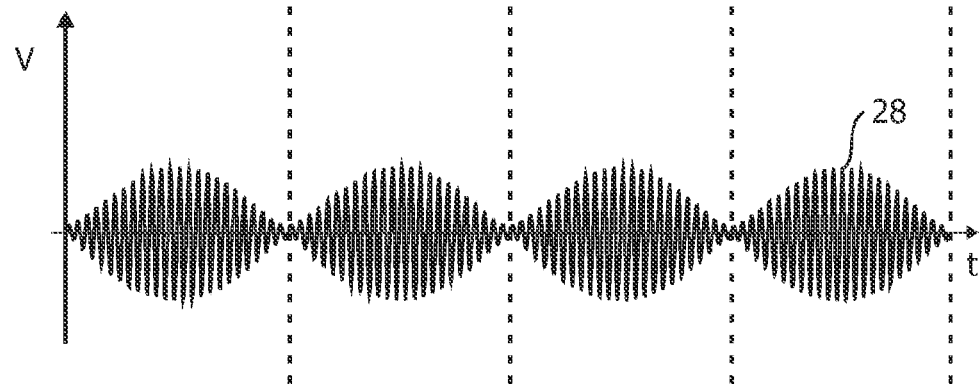

The operation of the switching mode power supply 4 is shown in FIGS. 3a-3b. FIG. 3a shows a timing diagram of the primary side alternating voltage 27, where the zero-crossings 20 of the voltage 27 are marked by dashed lines. The operating voltage 28 at the secondary side terminals 10 of the self-oscillating power supply 4 is shown in FIG. 3b. As can be seen from FIG. 3b, due to the switching behavior of the transistors T1 and T2, the operating voltage shows a high frequency oscillation at a frequency of e.g. 50 kHz. The high frequency oscillation is amplitude-modulated by a rectified sine wave, i.e. corresponding to the rectified primary side alternating voltage 27. The operating voltage 28 at the secondary side terminals 10 of the power supply 4 thus exhibits a high-frequency component and an envelope component at a lower frequency, according to the present embodiment, at mains frequency, i.e. 50/60 Hz. It is noted, that FIG. 3b shows the high-frequency component in simplified form only, for reasons of clarity. As can be seen from FIG. 3b, the operating voltage 28 exhibits "zero-points" 20, which correspond to the zero-crossings 20 of the primary side alternating voltage 27. FIG. 3b shows the operating voltage 28 of the power supply 4 under optimal conditions, i.e. with a typical halogen lamp connected. Here, the oscillation is started by said start-up circuit of the power supply 4 at each zero-crossing 20 and is self-maintained until the subsequent zero-crossing 20.

When a typical self-oscillating power supply 4, such as shown in FIG. 2, however is operated with a relatively small load, such as the LED unit 2, it is possible that the oscillation extinguishes or fades out early, i.e. between two zero-crossings 20. This situation is shown in the timing diagram of FIG. 4. As will become apparent, due to the early extinction of the self-oscillation, power is present at the secondary side terminals 10 of the power supply 4 only for limited time in each half cycle of the alternating voltage 27, i.e. between two subsequent zero-points 20, which might result in optical flicker of the connected LED unit 2 and a relatively low power factor.

Figure 5A:
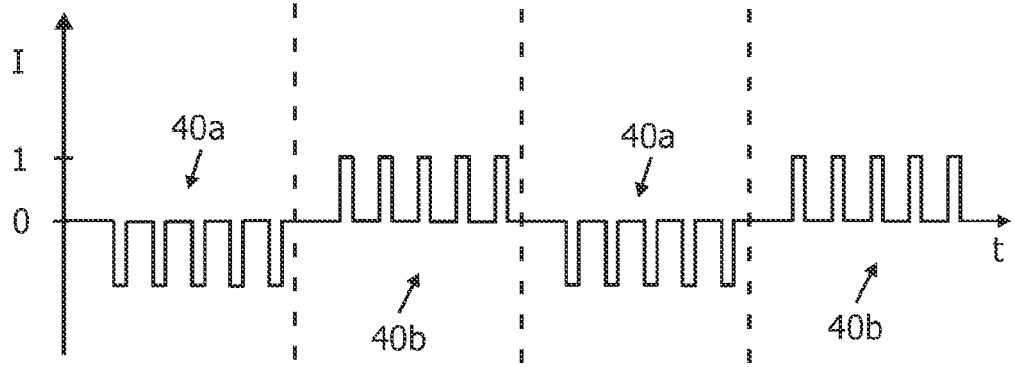
FIGS. 5a and 5b illustrate the operation of the LED lamp of FIG. 1 in further timing diagrams according to a first exemplary control method and FIGS. 6a and 6b illustrate the operation of the LED lamp of FIG. 1 in further timing diagrams according to a second exemplary control method.

The operation of the embodiment of FIG. 1 according to a first exemplary control method is in the following explained with reference to FIGS. 5a-5b.

Figure 4:
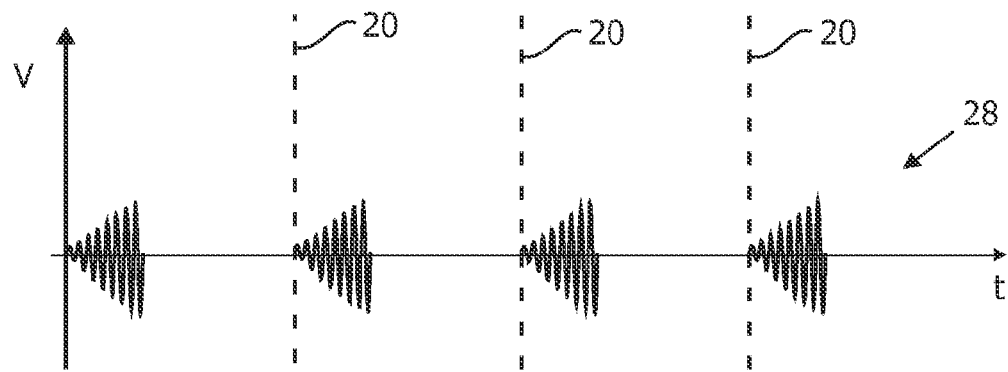
FIG. 4 illustrates the operation of the self-oscillating power supply according to FIG. 2 when operated with a typical low-power lighting unit.

As mentioned above, upon connection with power, the start-up circuit initiates the oscillation of the transistors T1 and T2, for example as shown in FIG. 4. The envelope detector 19 of the circuit arrangement 3 determines the timing of the zero-points 20 by high-frequency demodulation of the operating voltage 28 for some cycles and by comparing the demodulated signal with a threshold close to zero volt. In this phase, the operation corresponds to the timing diagram of FIG. 4.

The envelope detector 19 accordingly provides pulse controller 18 with cycle information, corresponding to the timing of the zero-points 20. Additionally, the pulse controller 18 receives the momentary load of the LED unit 2 from the output/driver unit 11. According to the present example, a relatively low load of 3 W is provided by the (dimmed) LED unit 2.

The pulse controller 18 determines from the momentary load the number and positioning of the trigger pulses 40a, 40b in each cycle of the operating voltage 28, i.e. between two subsequent zero-points 20. The pulse controller 18 then operates one of the transistors 24 of the pulse generator 17 to provide a positive 40b or negative trigger pulse 40a. As shown in FIG. 5a, in a first cycle of the operating voltage 28, i.e. in a first half-cycle of primary side alternating voltage 27, a pulse train of negative trigger pulses 40a is generated, while in a second cycle, a pulse train of positive trigger pulses 40b is generated.

In addition, pulse controller 18 controls switching device 29 of the output 11 so that the LED unit 2 and the driver unit/buffer stage (not shown) of output 11 are disconnected from the power supply 4 for an interval of 20-100 μs after each zero-point 20. Accordingly, the oscillation of the switching regulator of the power supply 4, i.e. the half-bridge formed by T1 and T2, initiated by the start-up circuit, fades away quickly, so that higher pulse frequencies are possible.

Figure 5B:
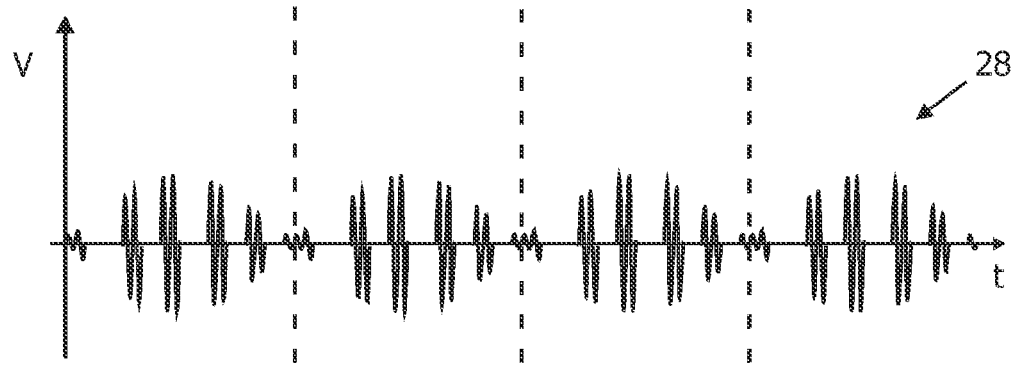

FIG. 5b shows the correspondingly resulting operating voltage 28 of the self-oscillating power supply 4. As can be seen from the figure, the oscillation, initiated by the start-up circuit of the power supply 4 fades almost instantly. The oscillation then is re-initiated after each of the trigger pulses 40a, 40b is injected into the power supply 4 by circuit arrangement 3. The injection of the trigger pulse 40a, 40b into the power supply 4 at the secondary side terminals 10 induces a corresponding voltage in the primary side of current transformer CT due to the inductive coupling and thus causes a corresponding voltage at transistors T1 and T2. Accordingly, the self-oscillation is restarted.

When comparing FIG. 5b with FIG. 4, it can be seen that the conduction interval or time, i.e. the time in each cycle in which power is transferred by the power supply 4 to the load, i.e. the LED unit 2, is correspondingly increased. The control of the circuit arrangement 3 thus provides an improved operation of the self-oscillating power supply 4 even in case only a reduced load is applied.

Furthermore, the conduction time is distributed more even in each cycle, so that the compatibility of the lamp 1 is enhanced, in particular when used with a phase-cut dimmer.

According to the above, the shown multiple trigger pulses 40a, 40b are injected mainly because the self-oscillation fades out after some time due to the low load. However, it may be conceivable that the pulse controller 18 controls the switching device 29 to disconnect the LED unit 2 prior to each and thus alternating with the trigger pulses 40a, 40b to provide the above mentioned distribution of the conduction time in each cycle, independent of the load of the LED unit 2.

Figure 6A:
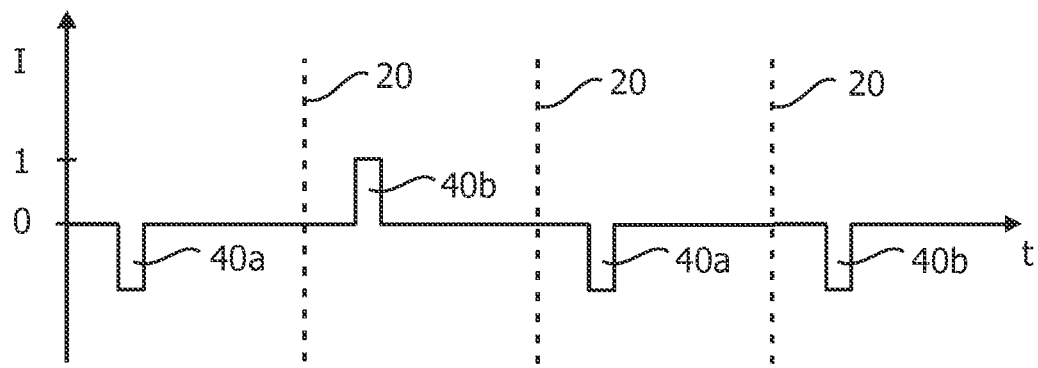
Figure 6B:
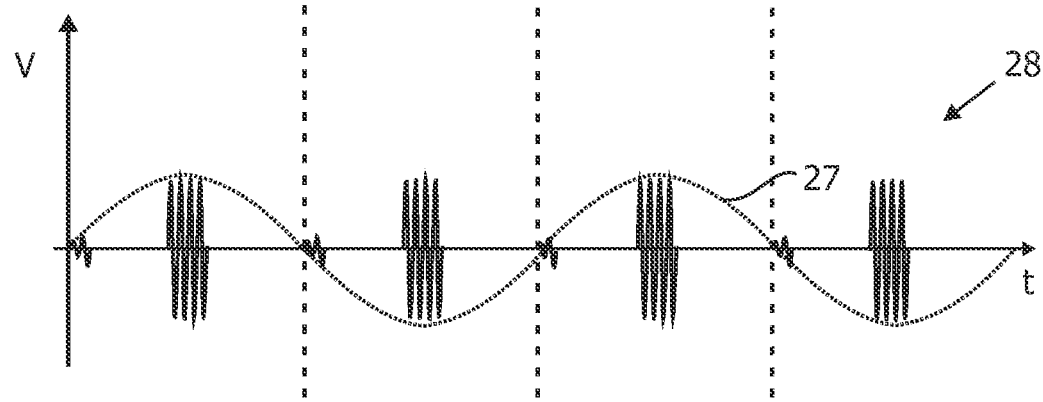

FIGS. 6a and 6b show the operation of the embodiment of FIG. 1 according to a second exemplary control method. The operation according to the present second control method corresponds to the operation explained above with reference to FIGS. 5a and 5b with the exception that here, pulse controller 18 operates pulse generator 17 to provide a single trigger pulse 40a, 40b in each cycle of operating voltage 28, as can be seen from FIG. 6a.

The pulse controller 18 according to the present example injects the respective trigger pulse 40a, 40b so that power is transferred to the LED unit 2 only during said conduction interval, which is here positioned symmetrical between two zero-points 20. To allow this, the pulse controller 18 determines the momentary load of the LED unit 2 at the output/driver unit 11 to determine the time of the conduction interval and the positioning of the trigger pulse 40a, 40b with respect to each zero-point 20. After some cycles, the pulse controller 18 compares the voltage Vs of the envelope component at the beginning of the conduction interval with the voltage Ve of the envelope component at the end of the conduction interval. The symmetrical positioning of the conduction interval is reached when Vs=Ve. In the case of Vs>Ve, the pulse controller 18 reduces the delay between the zero-point 20 and the injection of the trigger pulse 40a, 40b in subsequent cycles. In the respective other case of Vs<Ve, the delay is increased.

As discussed before, pulse controller 18 additionally controls switching device 29 of the output 11 so that the LED unit 2 and the driver unit buffer stage (not shown) of output 11 are disconnected from the power supply 4 for an interval of 1-1.5 ms after each zero-point 20, so that the oscillation, initiated by the start-up circuit of power supply 4 fades almost instantly.

Accordingly, the LED unit 2 is provided with power when the operating voltage 27 provides maximum voltage, i.e. during peak voltage. For reference, the operating voltage 27 is shown in FIG. 6b by a dotted line. The present embodiment thus provides an enhanced power factor due to the high voltage, provided to LED unit 2, in particular for use with non-dimmable types of power supplies 4.

Other variations to the disclosed embodiments can be understood and effected by those skilled in the art in practicing the claimed invention from the study of the drawings, the disclosure and the dependent claims. For example, it may be conceivable to operate the invention in an embodiment, in which:

instead of a GU 5.3 type socket connector, the input 12 comprises a different type of socket connector, the pulse controller 18, instead of comprising a microcontroller, comprises at least a NE555, the output 11 comprises a buffer stage and/or a LED driver unit and said switching device 29 is formed integrally with said buffer stage and/or LED driver unit and/or the switching device 29 is formed integrally with said input 12 or formed as a separate component between input 12 and output 11.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A Circuit arrangement for operating at least one low-power lighting unit with a self-oscillating power supply, the self-oscillating power supply having a primary side for connection to a power source and a secondary side for connection to the circuit arrangement, the circuit arrangement comprising:
   an input for receiving an operating voltage from said self-oscillating power supply at the secondary side of the self-oscillating power supply,
   an output for connection to one or more low-power lighting units,
   a pulse generator, connected with said secondary side of said self self-oscillating power supply and configured to inject at least one trigger pulse into the secondary side of said self-oscillating power supply during operation and
   a pulse controller, connected at least with said pulse generator and configured to control said pulse generator in dependence of said operating voltage.

2. The Circuit arrangement according to claim 1, wherein said pulse generator comprises at least one switchable energy storage device and where said pulse generator is further adapted to connect said at least one energy storage device with said input to inject said at least one trigger pulse into the secondary side of said self-oscillating power supply.

3. The Circuit arrangement according to claim 1, further comprising a switching device, said switching device being controllable by said pulse controller and arranged to control the connection between said one or more low-power lighting units and said self-oscillating power supply.

4. The Circuit arrangement for operating at least one low-power lighting unit with a self-oscillating power supply, the self-oscillating power supply having a primary side for connection to a power source and a secondary side for connection to the circuit arrangement, the circuit arrangement comprising:
   an input for receiving an operating voltage from said self-oscillating power supply at the secondary side of the self-oscillating power supply,
   an output for connection to one or more low-power lighting units,
   a pulse generator, connected with said secondary side of said self-oscillating power supply and configured to inject at least one trigger pulse into the secondary side of said self-oscillating power supply during operation and
   a pulse controller, connected at least with said pulse generator and configured to control said pulse generator in dependence of said operating voltage,
   further comprising an envelope detector, connected with said input and said pulse controller and configured to determine of an envelope component of said operating voltage, wherein said pulse controller is configured to control said pulse generator, so that at least one trigger pulse is injected into said self-oscillating power supply in each cycle of said envelope component.

5. The Circuit arrangement according to claim 4, wherein the pulse controller is configured to control said pulse generator, so that said at least one trigger pulse is injected with a predefined phase angle in each cycle of said envelope component.

6. The Circuit arrangement according to claim 4, wherein the pulse generator is controlled, so that multiple trigger pulses are injected into said self-oscillating power supply in each cycle of said envelope component.

7. The Circuit arrangement according to claim 6, wherein said pulse generator is adapted to inject at least a first trigger pulse with a forward polarity and a second trigger pulse with a reverse polarity.

8. The Circuit arrangement according to claim 7, wherein said pulse controller is adapted to control said pulse generator in dependence of load information of said at least one low-power lighting unit.

9. The Circuit arrangement according to claim 1, wherein said output comprises a driver unit.

10. The Circuit arrangement according to claim 1, wherein said circuit arrangement further comprises a rectifier circuit, connected with said input and arranged parallel to said pulse generator.

11. The Circuit arrangement according to claim 1, wherein said low-power lighting unit is a LED unit.

12. A LED lamp with a circuit arrangement according to claim 1 and at least one LED unit, connected with the output of the said circuit arrangement.

13. A Lighting system comprising a power supply and one or more LED lamps according to claim 12.

14. A Method of operating at least one low-power lighting unit with a circuit arrangement, the method comprising;
receiving an operating voltage from a self-oscillating power supply at an input of the circuit arrangement, the self-oscillating power supply having a primary side for connection to a power source and a secondary side for connection to the circuit arrangement,
connecting one or more low-power lighting units to an output of the circuit arrangement,
connecting a pulse generator with said secondary side of aid self-oscillating power supply, and connecting a pulse controller with said pulse generator,
injecting at least one trigger pulse into the secondary side during operation, and
controlling said pulse generator in dependence of said operating voltage.

15. The Circuit arrangement according to claim 1, wherein the at least one trigger pulse injected into the secondary side of said self-oscillating power supply during operation causes a start or restart of self-oscillation of said power supply.

16. The method according to claim 14, further comprising causing a start or restart of self-oscillation of said power supply as a result of the at least one trigger pulse injected into the secondary side of said self-oscillating power supply during operation.

* * * * *